(12) United States Patent
Sharma et al.

(10) Patent No.: US 9,205,340 B2
(45) Date of Patent: Dec. 8, 2015

(54) STOWABLE EXPANDING CONTROLLER FOR A MOBILE GAMING DEVICE, APPARATUS AND SYSTEM

(75) Inventors: Sameer Sharma, Santa Clara, CA (US); Tsai Chien Kao, Taipei (TW); Tsung Cheng Lin, Taipei (TW); Yen Chiu Hsu, Taipei (TW)

(73) Assignee: INTEL CORPORATION, Santa Clara, CA (US)

( * ) Notice: Subject to any disclaimer, the term of this patent is extended or adjusted under 35 U.S.C. 154(b) by 293 days.

(21) Appl. No.: 13/566,033

(22) Filed: Aug. 3, 2012

(65) Prior Publication Data

US 2014/0035834 A1 Feb. 6, 2014

(51) Int. Cl.
*A63F 13/92* (2014.01)
*G06F 1/16* (2006.01)
*G06F 3/02* (2006.01)
*G06F 3/023* (2006.01)

(52) U.S. Cl.
CPC .............. *A63F 13/92* (2014.09); *G06F 1/1626* (2013.01); *G06F 1/1669* (2013.01); *G06F 3/0219* (2013.01); *G06F 3/0231* (2013.01)

(58) Field of Classification Search
CPC ........................................................ A63F 13/92
USPC ................................................. 345/156–184
See application file for complete search history.

(56) References Cited

U.S. PATENT DOCUMENTS

| 7,095,387 | B2 | 8/2006 | Lee et al. |
| 8,009,143 | B2 | 8/2011 | Huang |
| 2004/0056843 | A1 | 3/2004 | Lin et al. |
| 2006/0152484 | A1* | 7/2006 | Rolus Borgward ........... 345/157 |
| 2007/0178966 | A1* | 8/2007 | Pohlman et al. ................ 463/36 |
| 2011/0230178 | A1 | 9/2011 | Jones et al. |
| 2011/0260969 | A1* | 10/2011 | Workman ..................... 345/161 |
| 2012/0062177 | A1* | 3/2012 | Solomon et al. .............. 320/114 |
| 2012/0229309 | A1* | 9/2012 | Liu ................................. 341/22 |
| 2013/0068916 | A1* | 3/2013 | Mensing et al. .............. 248/558 |

FOREIGN PATENT DOCUMENTS

KR 20-2012-0005257 7/2012

OTHER PUBLICATIONS

International Search Report received for PCT Patent Application No. PCT/US2013/047341, mailed Sep. 2, 2013, 13 pages.

* cited by examiner

*Primary Examiner* — Ryan A Lubit
(74) *Attorney, Agent, or Firm* — Kacvinsky Daisak Bluni PLLC

(57) ABSTRACT

Embodiments of an apparatus, system and method are described for mobile gaming. In some embodiments an apparatus comprises one or more processors and an enclosure arranged to support a display on a first side of the enclosure and a control device on a second side of the enclosure opposite the first side, the control device removeably arranged in a recessed cavity on the second side of the enclosure. Other embodiments are described and claimed.

31 Claims, 13 Drawing Sheets

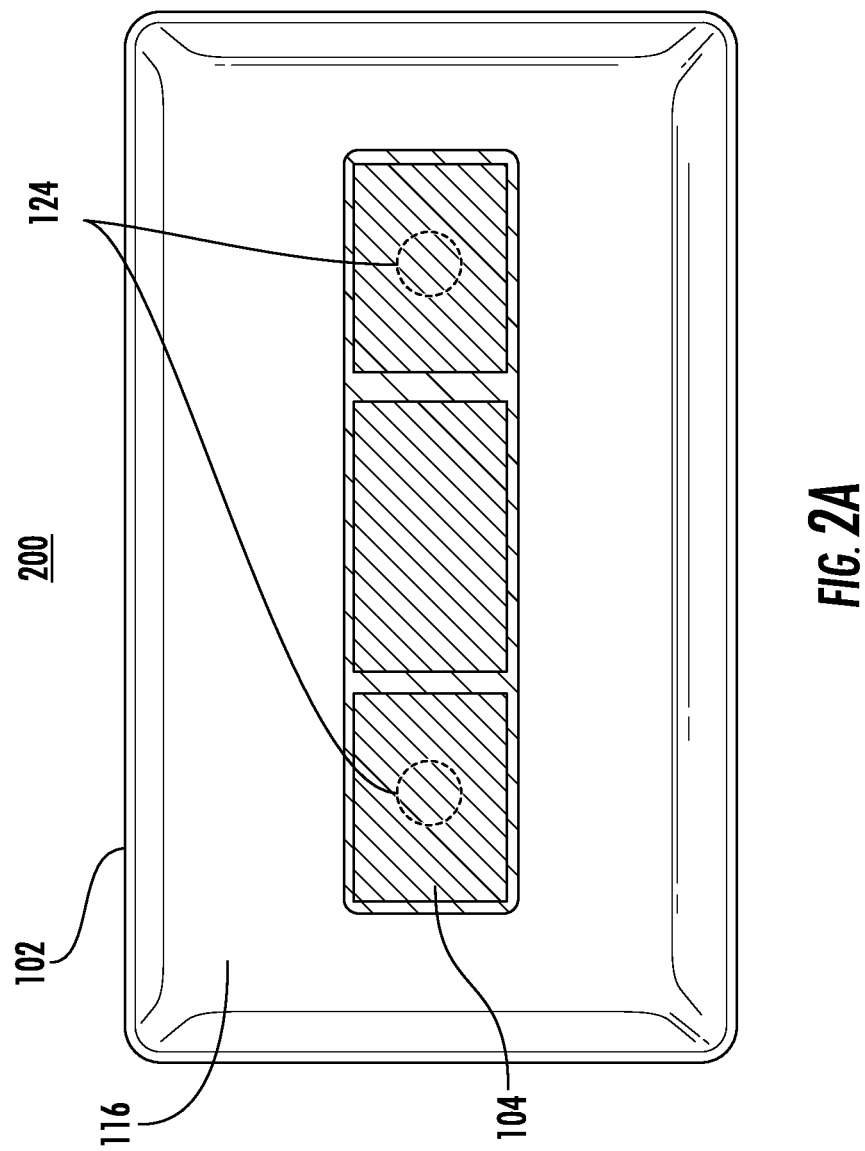

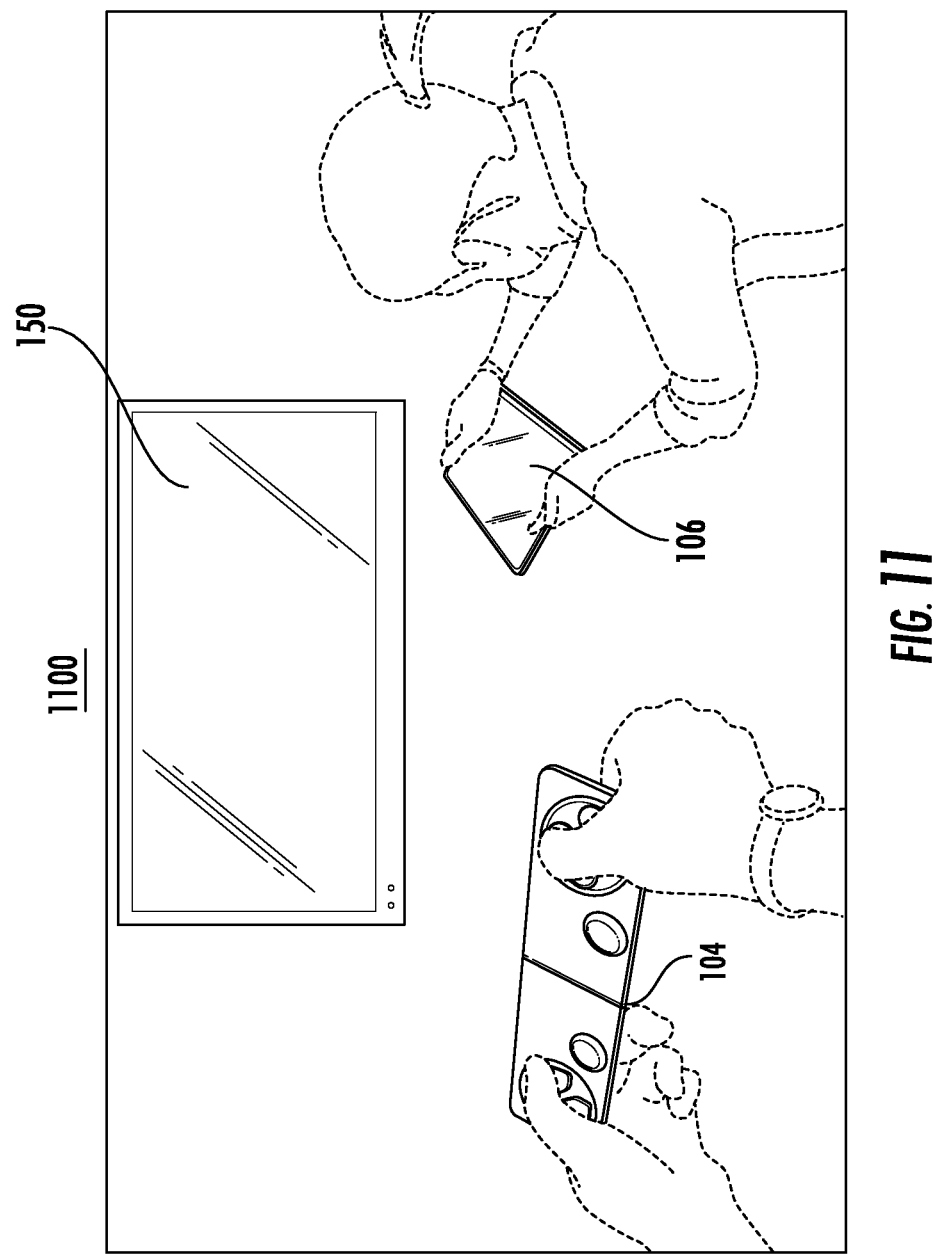

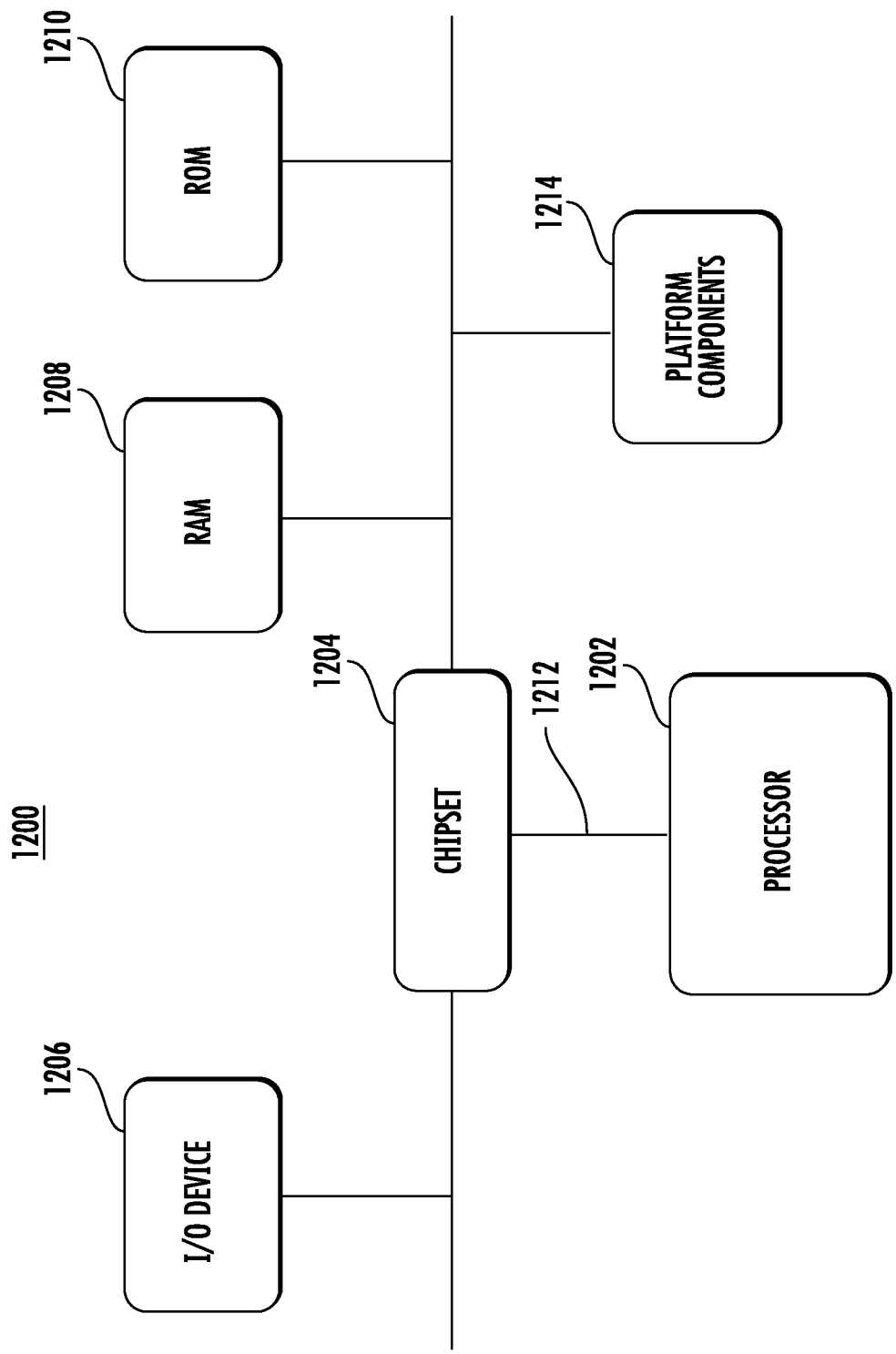

STOWABLE EXPANDING CONTROLLER FOR A MOBILE GAMING DEVICE, APPARATUS AND SYSTEM

BACKGROUND

The performance and capabilities of modern computing systems have increased rapidly in recent years. Many computing system today include one or more processors, memory, wireless connectivity, displays and other components requiring electrical power. Additionally, modern mobile computing systems continue to be used in a variety of different locations and usage scenarios which require ergonomically designed systems to ensure a satisfactory user experience. Interactive activities performed using a mobile computing system, such as playing an interactive game, are also on the rise. As a result, it is desirable to improve mobile computing device designs. Consequently, there exists a substantial need for techniques to adapt mobile computing devices to accommodate a variety of components in an ergonomically efficient design. It is with respect to these and other improvements that the embodiments described herein are needed.

BRIEF DESCRIPTION OF THE DRAWINGS

FIG. 2A illustrates one embodiment of a second apparatus or system.

FIG. 11 illustrates one embodiment of a third example implementation.

FIG. 12 illustrates one embodiment of a tenth apparatus or system.

DETAILED DESCRIPTION

The embodiments are generally directed to a mobile computing device, apparatus and system. Various embodiments provide a system or apparatus that include one or more processors and an enclosure arranged to support a display on a first side of the enclosure and a control device on a second side of the enclosure opposite the first side. In some embodiments, the control device is removeably arranged in a recessed cavity on the second side of the enclosure. While referred to hereinafter as a control device or controller, it should be understood that the control device may comprise any suitable input device and still fall within the described embodiments. Other embodiments are described and claimed.

With the progression over time toward the use of computing devices for a plurality of different purposes, the design of the devices has evolved to accommodate certain of these activities. Modern mobile computing devices, such as tablet computers, handheld computing devices and smartphones, have recently evolved to serve as gaming and interactive media devices. Many current mobile computing devices rely on a wholly touch screen experience, which may be desirable for activities such as reading and browsing the Internet, but may not be as advantageous for activities that require dynamic and frequency user input such as playing a game. Touch screen based gaming may have certain drawbacks for playing games, including a lack of haptic feedback which would allow a user to feel if a certain button has been pressed, for example. Therefore, some embodiments described herein are directed to techniques and designs to ergonomically incorporate a controller, control device or other input device into a sleek and fully functional mobile computing device. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
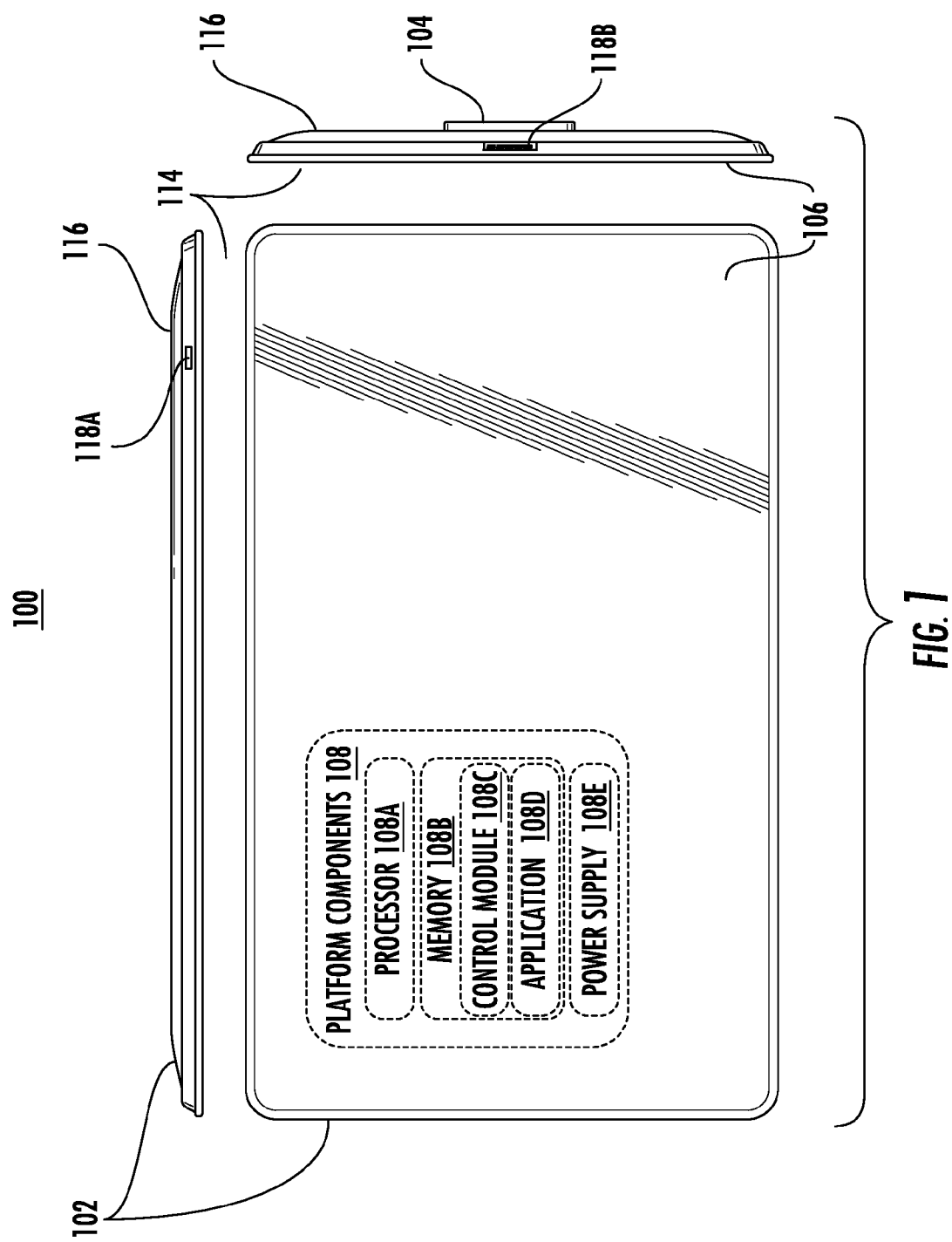
FIG. 1 illustrates one embodiment of a first apparatus or system.

FIG. 1 illustrates one embodiment of a mobile computing device, apparatus or system 100. Multiple views or perspective views of the same computing device are shown in FIG. 1 for purposes of illustration. In various embodiments, the mobile computing device 100 may comprise multiple nodes, element or components. A node, element or component generally may comprise any physical or logical entity in the mobile computing device 100 and may be implemented as hardware, software, or any combination thereof, as desired for a given set of design parameters or performance constraints. Although FIG. 1 may show a limited number of nodes, elements and components by way of example, it can be appreciated that more or less nodes, elements or components may be employed for a given implementation.

In various embodiments, the mobile computing device 100 may comprise a tablet computer, handheld computer, personal digital assistant (PDA), cellular telephone, combination cellular telephone/PDA, smartphone, portable computer, pager, messaging device, media player, digital music player, or other suitable mobile computing device. Various embodiments described herein include reference to a tablet computer. The embodiments are not limited in this context.

Mobile computing device 100 may comprise a device operative to form part of a wired communications system, a wireless communications system, or a combination of both. For example, the mobile computing device 100 may comprise one or more nodes arranged to communicate information over one or more types of wired communication links. Examples of a wired communication link may include, without limitation, a wire, cable, bus, printed circuit board (PCB), Ethernet connection, peer-to-peer (P2P) connection, backplane, switch fabric, semiconductor material, twisted-pair wire, coaxial cable, fiber optic connection, and so forth. The mobile computing device 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The mobile computing device 100 may communicate information in accordance with one or more standards as promulgated by a standards organization. In one embodiment, for example, various devices comprising part of the communications system 100 may be arranged to operate in accordance with one or more of the IEEE 802.11 standard, the WiGig Alliance™ specifications, WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the mobile computing device 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; IEEE 802.16 standards for WMAN including the IEEE 802.16 standard such as 802.16-2004, 802.16.2-2004, 802.16e-2005, 802.16f, and variants; WGA (WiGig) progeny and variants; European Computer Manufacturers Association (ECMA) TG20 progeny and variants; and other wireless networking standards. The embodiments are not limited in this context.

The mobile computing device 100 may communicate, manage, or process information in accordance with one or more protocols. A protocol may comprise a set of predefined rules or instructions for managing communication among nodes. In various embodiments, for example, a communications system may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

In some embodiments, the mobile computing device 100 may comprise or be associated with a network and a plurality of other nodes. In various embodiments, the nodes may be implemented as various types of wireless or mobile computing devices. Examples of wireless devices may include, without limitation, an IEEE 802.15.3 piconet controller (PNC), a controller, an IEEE 802.11 PCP, a coordinator, a station, a subscriber station, a base station, a wireless access point (AP), a wireless client device, a wireless station (STA), a laptop computer, ultra-laptop computer, portable computer, personal computer (PC), notebook PC, tablet computer, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, mobile computing device 100 may comprise or include one more wireless interfaces and/or components for wireless communication such as one or more transmitters, receivers, transceivers, chipsets, amplifiers, filters, control logic, network interface cards (NICs), antennas, antenna arrays, modules and so forth. Examples of conventional antennas may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, mobile computing device 100 may comprise or form part of a wireless network. In some embodiments, for example, the wireless network may comprise or be implemented as various types of wireless networks and associated protocols suitable for a WPAN, a Wireless Local Area Network (WLAN), a Wireless Metropolitan Area Network, a Wireless Wide Area Network (WWAN), a Broadband Wireless Access (BWA) network, a radio network, a television network, a satellite network such as a direct broadcast satellite (DBS) network, a long term evolution (LTE) network and/or any other wireless communications network arranged to operate in accordance with the described embodiments.

While the embodiments are not limited in this context, mobile computing device 100 illustrates one possible computing device in some embodiments. In various embodiments, mobile computing device 100 may include enclosure 102, control device 104, display 106, platform component(s) 108, and input/output (I/O) devices 118A and 118B. In some embodiments, the platform component(s) may include but are not limited to one or more processors, processor units or processor circuits and/or memory. While a limited number and arrangement of components are shown in FIG. 1 for purposes of illustration, it should be understood that mobile computing device 100 may include any number or arrangement of components and still fall within the described embodiments. For example, mobile computing device 100 may additionally include, in some embodiments, memory containing instructions to be executed by one or more multi-core processors for example. The embodiments, however, are not limited to the elements or the configuration illustrated in this figure. Additional components for mobile computing device 100 are discussed in further detail below with reference to FIG. 12.

Platform component(s) 108 may comprise a processor 108A, memory 108B and power supply 108E in some embodiments. A processor may comprise any suitable electric device, semiconductor device, and system on chip or other component in some embodiments. For example, a processor may comprise a multi-core processor in various embodiments. In some embodiments, a processor may include or comprise one or more radio modules or combination transmitter/receiver (e.g. transceiver) devices. In various embodiments, the transceiver device may comprise a device that has both a transmitter and a receiver that are combined and share common circuitry or a single housing. For example, in some embodiments, the transceiver may be operative to enable wireless communication capabilities for mobile computing device 100. Other embodiments are described and claimed.

Memory 108B may comprise any suitable physical device operative to store data, programs, sequences of instructions or other information on a temporary or permanent basis for use in mobile computing device 100 in some embodiments. For example, memory may comprise volatile or non-volatile memory, RAM, ROM, virtual memory, solid state disk drive or a hard disc drive for example. The embodiments are not limited in this context. In some embodiments, memory 108B may be arranged to store one or more of control module 108C and/or application(s) 108D as described elsewhere herein. While referred to herein as a module, it should be understood that any reference to a module hereinafter may additionally or alternatively comprise or include logic. The embodiments are not limited in this respect.

In some embodiments, display 106 may comprise any suitable visual interface for displaying content to a user of the mobile computing device 100. In one embodiment, for example, the display 106 may be implemented by a liquid crystal display (LCD) or a touch-sensitive color LCD screen. The touch-sensitive LCD may be responsive to human touch or may be used with a stylus and/or a handwriting recognizer program in some embodiments. In other embodiments, display 106 may comprise a plasma display, light-emitting diode (LED) display or an organic light-emitting diode (OLED) display. Display 106 may comprise a digital touchscreen display arranged to occupy a substantial portion of a first side of a computing device 100 in some embodiments. In various embodiments, display 106 may be arranged on a first or front side 114 of mobile computing device 100.

Power supply 108E may comprise one or more energy storage modules comprising any device suitable for providing electrical power to computing device 100 in various embodiments. For example, power supply 108E may comprise a battery or a plurality of batteries or other energy storage devices capable of storing and providing power to computing device 100. Other embodiments are described and claimed.

In some embodiments, mobile computing device 100 may include one or more input/output (I/O) devices or ports 118A/118B. In some embodiments, the one or more I/O devices or ports 118A/118B may be communicatively coupled to the one or more platform components 108, such as processor 108A, to allow for communication with one or more peripheral devices coupled to the one or more I/O devices ports 118A/118B. In various embodiments, the one or more I/O devices ports 118A/118B may comprise one or more of an Ethernet interface, a Universal Serial Bus (USB) interface, a Thunderbolt® interface, a DisplayPort interface, a MiniDisplayPort (mDP) interface and/or the like. In other embodiments, the one or more I/O devices or ports may comprise any number of buttons, toggles, switches or any other suitable I/O device. Other embodiments are described and claimed.

While not shown in FIG. 1, in various embodiments, mobile computing device 100 may include one or more sensors. The one or more sensors may comprise one or more of a camera, accelerometer, proximity sensor, light sensor, compass or global positioning system (GPS) in some embodiments. The one or more sensors of mobile computing device 100 may be arranged to provide various different functionality for the device 100, such as tilt sensing, rotating one or more user interface elements displayed on display 106 or any other suitable function as one skilled in the art would understand. Other embodiments are described and claimed.

Mobile computing device 100 may include an enclosure 102 in some embodiments. Enclosure 102 may comprise an enclosure, housing, case or other device suitable to support, surround, protect or enclose one or more computing components for computing device 100. For example, enclosure 102 may comprise a rigid plastic or metal body that surrounds or supports one or more platform components 108 for computing device 100. In various embodiments, enclosure 102 may comprise the body or main portion of a tablet computer and may additionally include, support or comprise memory, one or more wireless transceivers operative to enable wireless communications for the computing device using one or more wireless communication protocols, display 106 or any other suitable component of computing device 100. Other embodiments are described and claimed.

In some embodiments, enclosure 102 may be designed to have a thin and sleek form factor in accordance with many modern computing system designs. In various embodiments enclosure 102 may additionally include or comprise a recessed cavity 105 (shown in more detail in FIG. 2B and elsewhere herein) on a second or back side 116 arranged to accommodate a control device 104. The control device 104 may be nested or stowed in the recessed cavity 105 when not in use as shown in more detail in FIG. 2A.

The control device 104 may be arranged to protrude from the recessed cavity 105 on the back side 116 of enclosure 102 in some embodiments when stowed. This may provide a convenient brace, handle or edge for a user when holding the device to allow for comfortable operation of the device as a tablet computing device. For example, the protrusion by the control device 104 may help to prevent the device from slipping through the fingers of a user when being held. In various embodiments the control device 104 may also have a tactile finish that is different than a finish of the enclosure 102. For example, the enclosure 102 may include a smooth, non-textured surface and the control device 104 may include a textured, grooved or otherwise tactile finish that is more easily gripped by a user. In some embodiments, different materials may be used for the enclosure 102 and the control device 104. For example, the enclosure 102 may comprise metal or plastic while the control device 104 may include a rubber or other highly tactile finish. The embodiments are not limited in this respect.

FIG. 2A illustrates a block diagram of one embodiment of a back side 116 view of a mobile computing device 200 that may be the same or similar to mobile computing device 100 of FIG. 1 in various embodiments where like elements are similarly numbered. As shown in FIG. 2A, the control device 104 may be secured in the recessed cavity 105 by way of one or more magnets 124 arranged in either or both the enclosure 102 or the control device 104. The magnets may be selected to provide a mechanical force that is great enough to hold the control device 104 in place in the recessed cavity 105 but able to be separated by a user without undue effort. While shown and described as being held in place using magnets 124, it should be understand that any suitable mechanical coupling could be used and still fall within the described embodiments.

In various embodiments the magnets 124 or in an area similar to that identified as magnets 124 in FIG. 2A, the control device 104 and/or the computing device 200 may comprise or include one or more sensors arranged to detect the presence of the control device 104 in the recessed cavity 105. For example, the magnets 124 and/or sensors may be arranged to detect the control device 104 in the nested position to allow the computing device 200 to deactivate the control device 104 as described elsewhere herein. The sensor may include a pressure sensor, proximity sensor or any other suitable type of sensor.

Figure 2B:
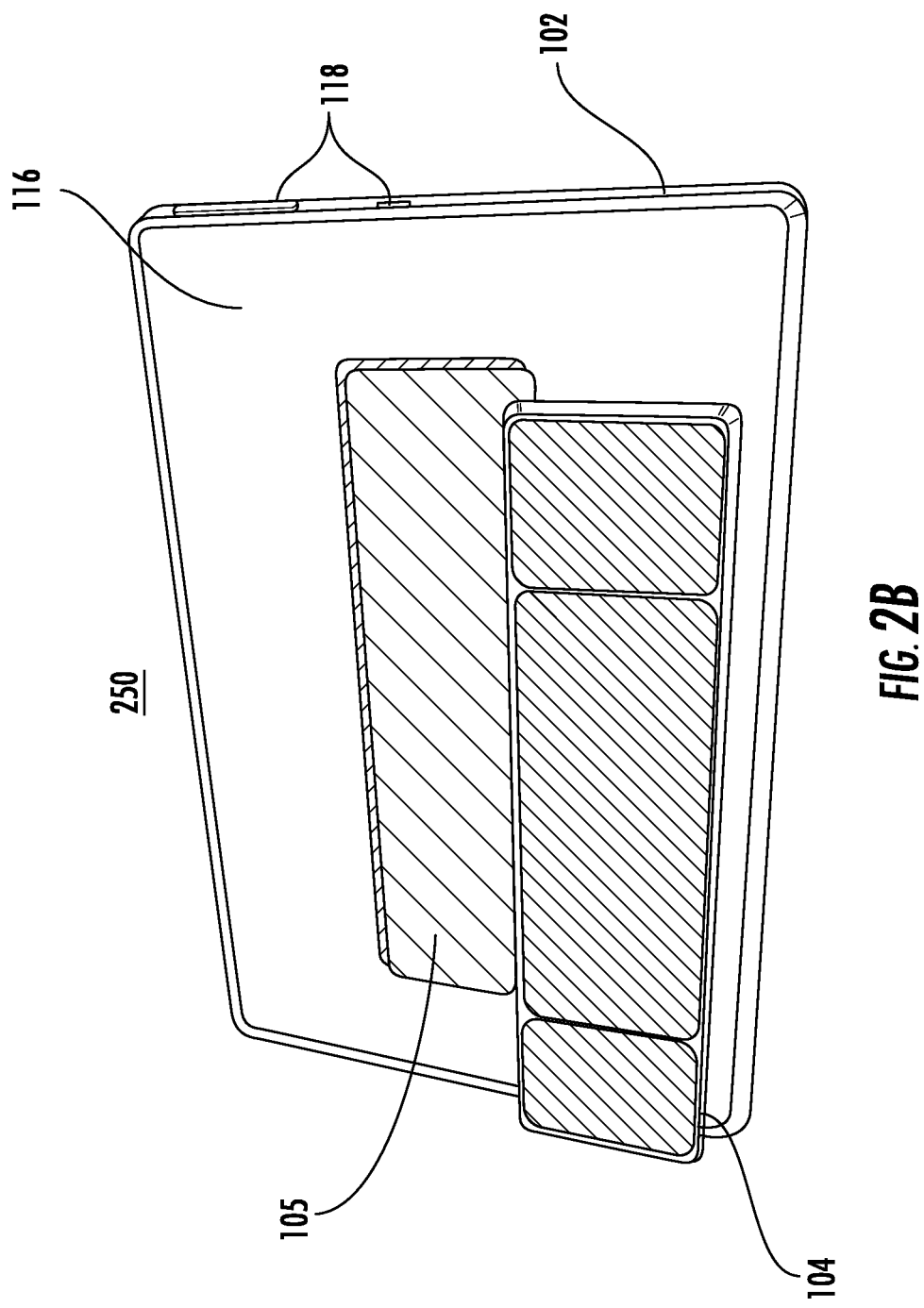
FIG. 2B illustrates one embodiment of a third apparatus or system.

FIG. 2B illustrates a block diagram of one embodiment of a back perspective view 116 of a mobile computing device 250 that may be the same or similar to mobile computing device 100 of FIG. 1 in various embodiments where like elements are similarly numbered. In some embodiments, FIG. 2B may more clearly illustrate that the control device 104 may be removably arranged in the recessed cavity 105. For example, the control device 104 shown in FIG. 2B has been removed from the recessed cavity 105, exposing the cavity 105 on the back 116 of the enclosure 102.

As shown in FIG. 2B, the recessed cavity 105 may be arranged to have a size and shape that is substantially similar to the size and shape of the control device 104 in the compact configuration shown. In some embodiments, a depth of the recessed cavity 105 may be selected such that a dimension of the depth is smaller than a width or thickness of the control device 104. In this manner, the control device 104 may protrude beyond the back side 116 of the enclosure 102 as described above. In other embodiments, a depth of the recessed cavity may be selected to be substantially similar to a width or thickness of the control device 104 such that control device 104 is flush with the back 116 when stowed. Other embodiments are described and claimed.

While not shown in FIG. 2A, the recessed cavity 105 may include different levels of recess in some embodiments. For example, the recessed cavity 105 may include one or more portions that include a further recessed depth to accommodate one or more input devices arranged on a front side of control device 104 opposite the side shown in FIG. 2B. In this manner, the input devices of control device 104 may not contact the inside surface of the recessed cavity 104. In other embodiments also not shown in FIG. 2B, recessed cavity 105 may include one or more mechanical adapters that mate with or secure control device 104 to enclosure 102 when stowed. For example, in addition to or in place of the magnets 124 described above, one or more springs, clips or other suitable connectors may be arranged in recessed cavity 105 to accept and secure control device 104 in the stowed position. The embodiments are not limited in this respect.

Figure 3:
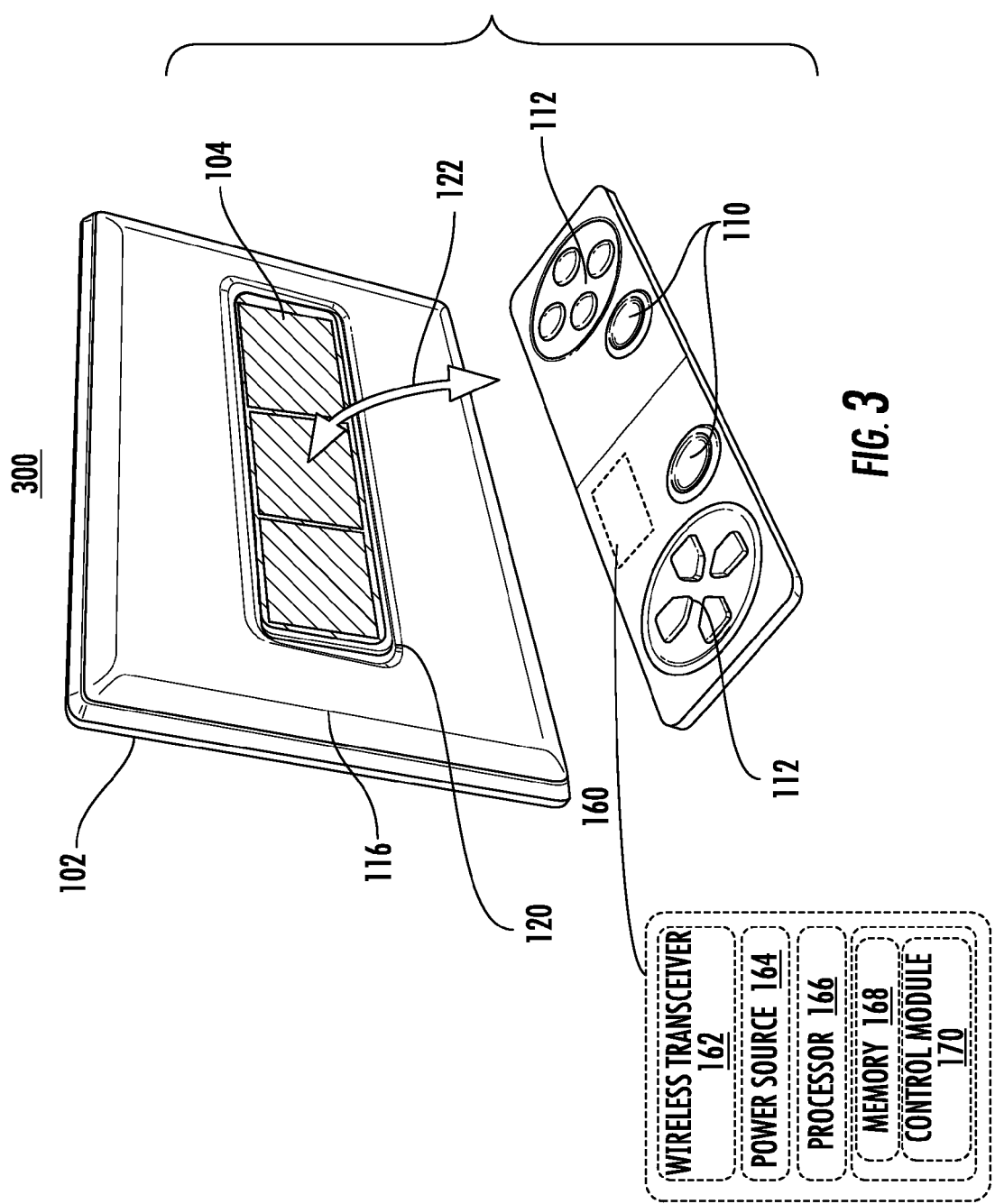
FIG. 3 illustrates one embodiment of a fourth apparatus or system.

FIG. 3 illustrates a block diagram of one embodiment of a back side 116 perspective view of a mobile computing device 300 that may be the same or similar to mobile computing device 100 of FIG. 1 in various embodiments where like elements are similarly numbered. In some embodiments, FIG. 3 illustrates control device 104 being removed from the recessed cavity 105 as shown by directional arrow 122. In the embodiments shown in FIG. 3, the control device 104 may be moveable from a stowed position in the recessed cavity 105 of enclosure 102 to a position where it has been removed and is separated from the enclosure 102. FIG. 3 also illustrates a front or top view of control device 104 that includes one or more integrated input devices 110 and one or more removable input device 112. While various embodiments shown and described herein include a control device 104 of a particular size, shape and/or configuration, it should be understood that any suitable control device 104 or input device could be used and still fall within the described embodiments.

As shown in FIG. 3, control device 104 may include platforms components 160 that may be the same or similar to comparable platform components 108 described with reference to FIG. 1. For example, control device 104 may include, without limitation, a wireless transceiver 162, power source 164, processor 166 and memory 168 which may be operative to store control module 170 that is executable by processor 166. In some embodiments, the wireless transceiver 162 may be operative to establish a wireless communication connection with tablet computing device 300 when the control device 104 is removed from the recessed cavity 105.

When removed from the computing device, the control device 104 may be operative to control one or more applications executed by one or more processors of the computing device in some embodiments. For example, as described in more detail elsewhere herein, the control device 104 may be operative to wirelessly control a video game or other application that is being played or executed on the associated computing device via a wireless communication connection between the devices.

In some embodiments, the control device 104 may include a power supply 164 such as a battery. The power supply 164 may be arranged to receive power from a power supply of the tablet computing device when the control device 104 is arranged in the recessed cavity 105 in some embodiments. For example, the power supply 164 of the control device may be charged by the power supply of the computing device when coupled. In other embodiments, the power supply 164 may be powered or charged by a direct connection to another alternating current or direct current source. Other embodiments are described and claimed.

Figure 4:
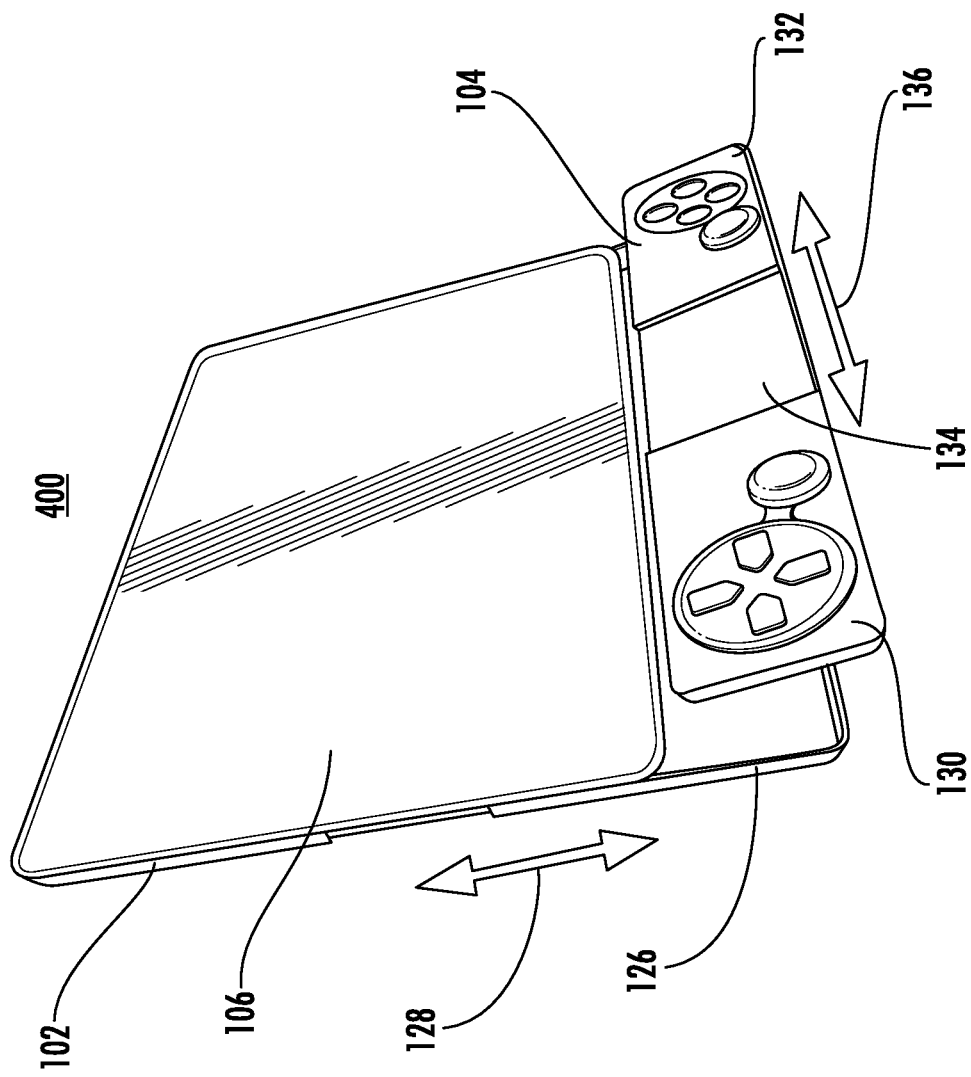
FIG. 4 illustrates one embodiment of a fifth apparatus or system.

FIG. 4 illustrates a block diagram of one embodiments of a front 114 perspective view of a mobile computing device 400 that may be the same or similar to mobile computing device 100 of FIG. 1 in various embodiments where like elements are similarly numbered. As shown in FIG. 4, the control device 104 may be adjustable. More particularly, the control device 104 may be arranged to expand from a first size (e.g. the size shown in FIG. 3 and FIG. 6) when arranged in the recessed cavity 105 or when used independently form the computing device to a second size when removed from the recessed cavity 105 and used in conjunction with the computing device as shown and described in more detail with reference to FIG. 5.

In various embodiments, the control device 104 may comprise a first portion 130 arranged to support a first set of input devices and a second portion 132 arranged to support a second set of input devices. The first 130 and second 132 portions may be coupled by a third portion 134 in some embodiments. For example, the third portion 134 may be arranged to support the first 130 and second portions 132 and to allow the first 130 and/or second 132 portion to slide in a direction indicated by arrow 136. In some embodiments, the first 130 and/or second 132 portions may be coupled to the third portion 134 by one or more tracks that allow either or both portions 130, 132 to slide toward or away from the opposing portion to increase or decrease the size of the control device 104 in at least one direction.

In some embodiments, computing device 400 may include a moveable support member 126 as shown in FIG. 4. The support member 126 may be arranged as part of the enclosure 102 in some embodiments. For example, the support member 126 may be arranged around a portion of a perimeter or as a portion of the perimeter or bezel of the enclosure 102 of the computing device in various embodiments. The support member 126 may be operative to rotate to form a stand to support the computing device in a first position and to slide to support the control device is a second position. The rotation of the support member 126 is shown and described in more detail with reference to FIG. 6.

The support member 126 in FIG. 4 is arranged to slide in a direction indicated by arrow 128. For example, the support member 126 may form part of a perimeter or bezel of enclosure 102 that includes a track or other mechanism to allow the support member 126 to slide. The arrangement of the support member 126 and the enclosure 102 may include attachment of the support member 126 to the enclosure 102 such that a mechanical force exists to prevent unwanted sliding of the support member and to allow the support member to be adjust by a user and to retain a desired position as selected by a user. In some embodiments, the support member 126 may slide to create an opening sized to accommodate the control device 104 in the expanded configuration as shown and described in more detail with reference to FIG. 5.

Figure 5:
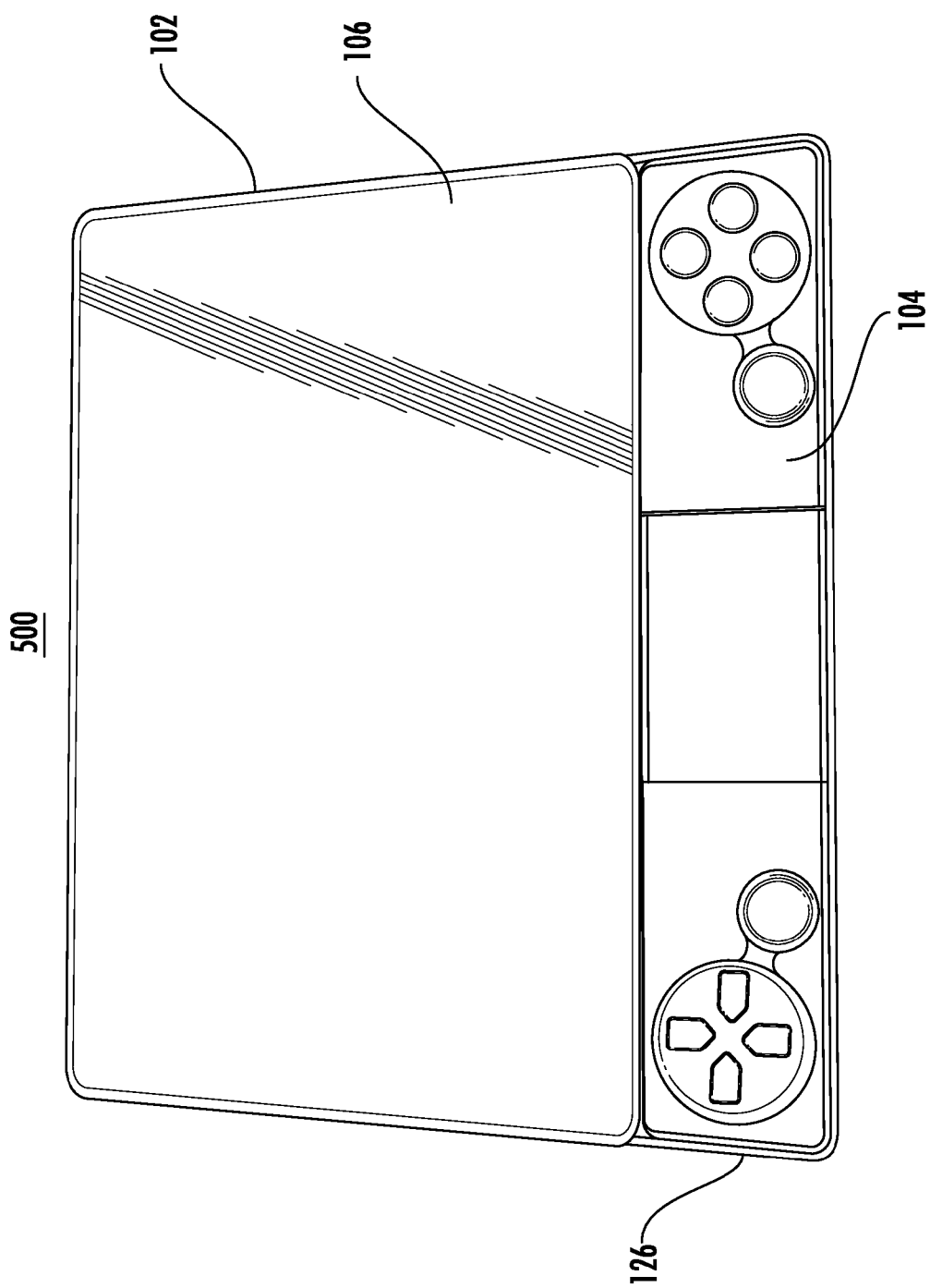
FIG. 5 illustrates one embodiment of a sixth apparatus or system.

FIG. 5 illustrates a block diagram of one embodiment of a front 114 perspective view of a mobile computing device 500 that may be the same or similar to mobile computing device 100 of FIG. 1 in various embodiments where like elements are similarly numbered. As shown in FIG. 5, the support member 126 may be fully extended to accommodate the control device 104 in a position below the display 106. In this position, the control device can be expanded as shown in FIG. 4 to have a second size selected to be larger than a first size when stowed in the recessed cavity 105. In some embodiments, the second size of control device 104 shown in FIG. 5 may be selected to be substantially the same as a size or dimension of one side of the computing device. In this manner, the control device 104 and enclosure 102 may be coupled together in a usable and substantially seamless fashion that allows for easy and effective holding of and interacting with the device.

In some embodiments, the control device 104 may be mechanically coupled to the support member 126. For example, the support member 126 may comprise a metal or other magnetically conductive material and the control device 126 may include one or more magnets (for example, a thin magnet around at least a portion of the perimeter of the control device) that couple the control device 104 to the support member 126. In other embodiments, the control device 104 may include a groove or clips that allow the control device to snap or otherwise mechanically couple with the support member 126. Other embodiments are described and claimed.

Figure 6:
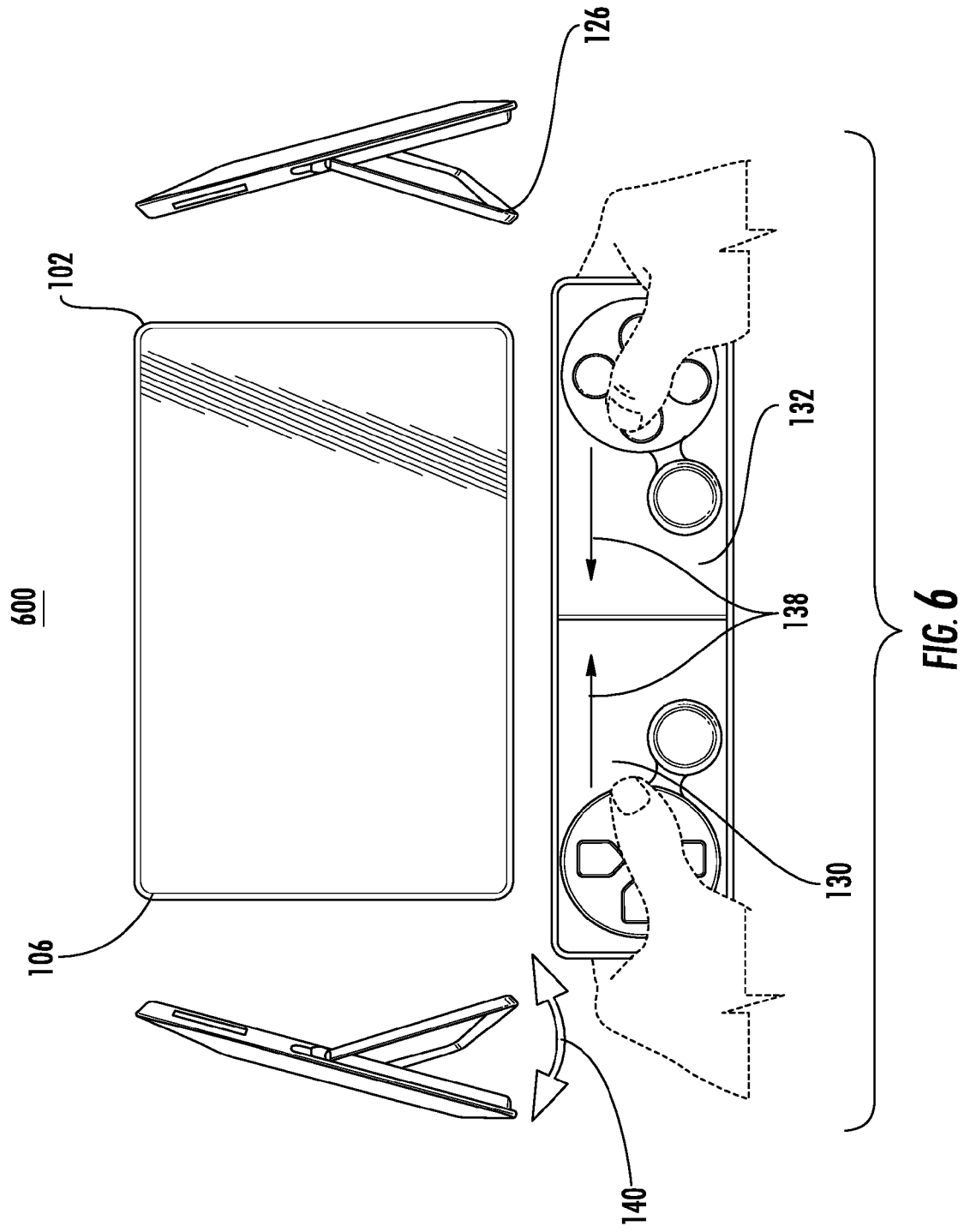
FIG. 6 illustrates one embodiment of a seventh apparatus or system.

FIG. 6 illustrates a block diagram of multiple views of a mobile computing device 600 that may be the same or similar to mobile computing device 100 of FIG. 1 in various embodiments where like elements are similarly numbered. As shown in FIG. 6, the support member 126 may additionally or alternatively be arranged or operative to rotate to form a stand to support the computing device in some embodiments. For example, the support member 126 may be arranged to rotate in a direction indicated by arrow 140 around a fixed pivot point where the support member 126 meets or is coupled to the enclosure 102 as shown in FIG. 6.

In various embodiments, the rotation 140 of the support member 126 may be restricted to create a desirable angle for viewing the computing device when placed on a flat surface such as a table or desk. FIG. 6 also illustrates that control device 104 may be adjusted when not coupled to the computing device as shown in FIG. 5. More particularly, the first 130 and/or second 132 portions of control device 104 have been moved in a direction indicated by arrows 138 to form a smaller size control device than the one shown in FIG. 5. In this manner, the control device 104 shown in FIG. 6 may be easier to hold and manipulate when not directly coupled to the enclosure 102. This may also comprise the size of the control device 104 when nested or stowed in the recessed cavity in some embodiments. The embodiments are not limited in this respect.

Figure 7:
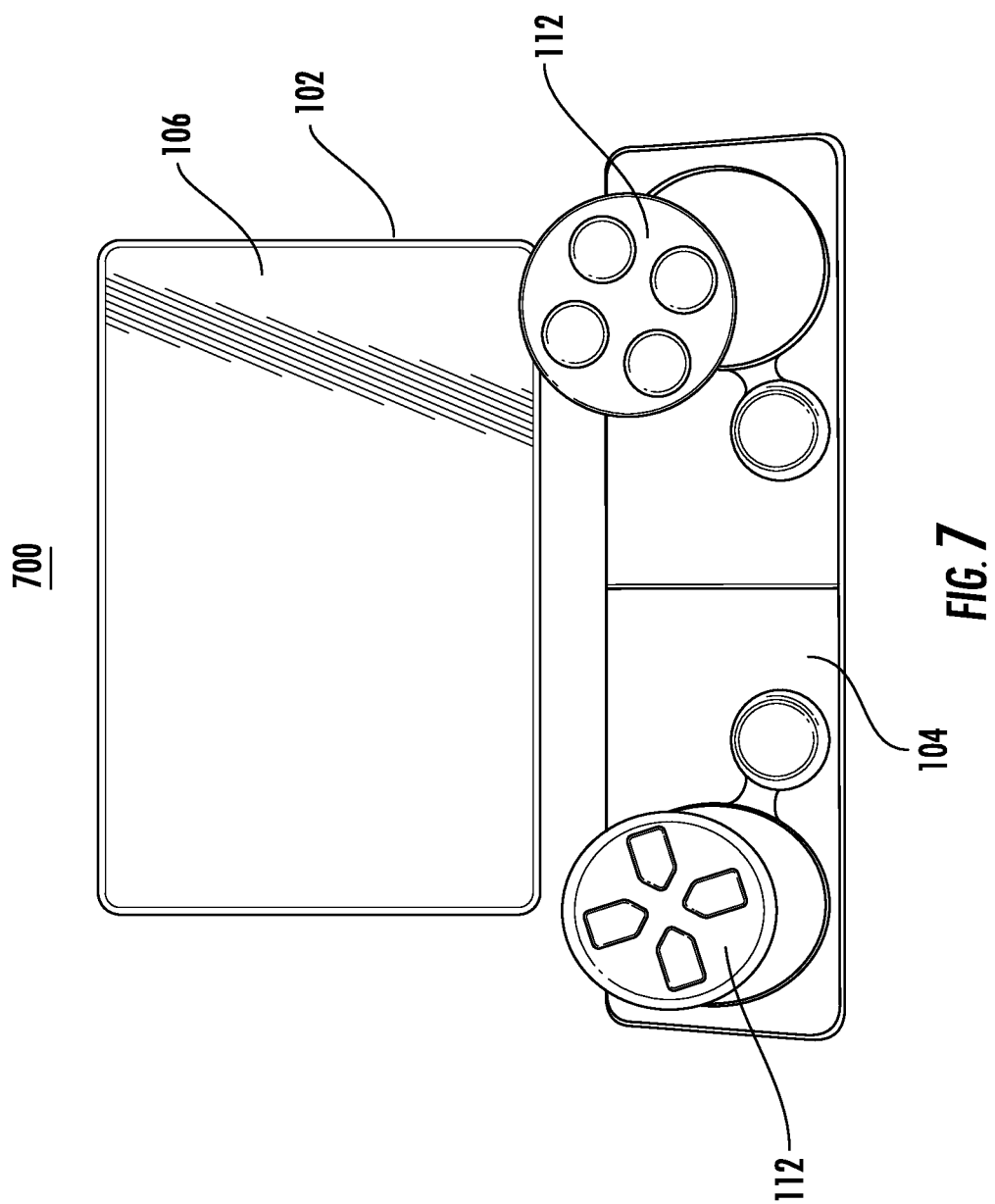
FIG. 7 illustrates one embodiment of an eighth apparatus or system.

FIG. 7 illustrates a block diagram of front perspective view of a mobile computing device 700 and control device 104 that may be the same or similar to mobile computing device 100 and control device 104 of FIG. 1 in various embodiments where like elements are similarly numbered. As shown in FIG. 7, the control device 104 may include at least one removable input device 112 in some embodiments. The removable input device 112 may be coupled to the control device 104 using magnets (not shown) or any other suitable mechanical connection such that they are mechanically secure when coupled to the control device 104 but removable by a normal user of the control device without undue burden. In some embodiments, the removable input device 112 may be operative when coupled to the display 106 of the tablet computing device as shown and described with reference to FIG. 8.

Figure 8:
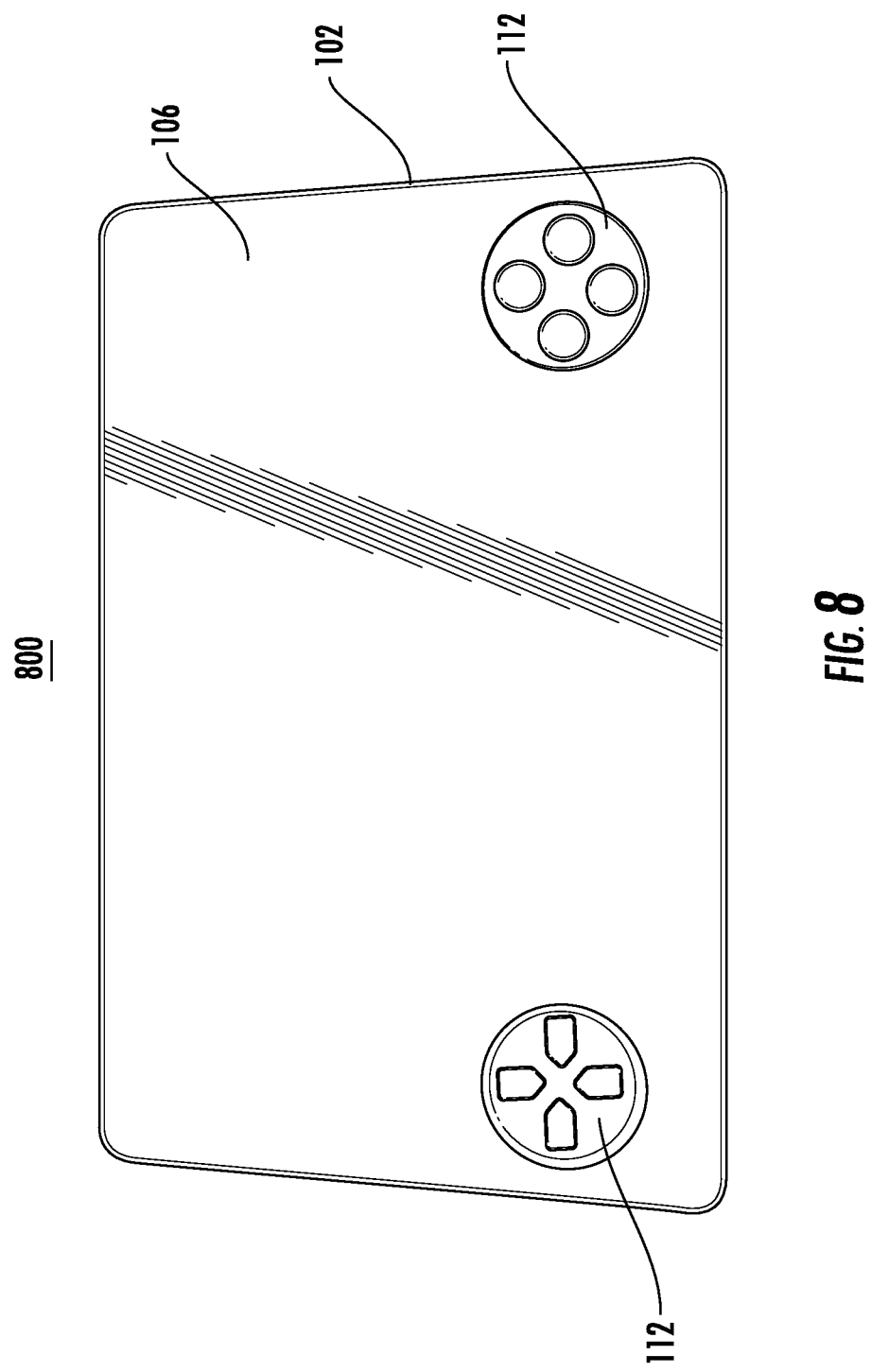
FIG. 8 illustrates one embodiment of a ninth apparatus or system.

FIG. 8 illustrates a block diagram of a mobile computing device 800 that may be the same or similar to mobile computing device 100 of FIG. 1 in various embodiments where like elements are similarly numbered. As shown in FIG. 8, the computing device 800 and/or display 106 may be arranged to support the one or more sets of removable input devices 112. For example, one or more magnet or other mechanical connection means may be included in the computing device 800 and/or the removable input devices 112 to allow the removable input devices 112 to be secured to specific areas or regions of the display 106 of the computing device 800.

In various embodiments, the one or more sets of removable input devices 112 may be operable when removed from the control device 104 and coupled to the computing device 800 as shown in FIG. 8. In some embodiments, each of the one or more removable input devices 112 may separately include one or more of an independent power supply, wireless transceiver, processor, memory and logic necessary to establish a wired or wireless connection with the computing device and to control one or more aspects associated with the computing device. Other embodiments are described and claimed.

In various embodiments, any of the above-described computing devices 100-800 and/or the control device 104 may include logic operative to enable a variety of functionality for the gaming system comprising both the computing device and the control device. For example, computing device 100 may include a control module 108C operative on the one or more processors 108A to establish a wireless communication connection with the control device 104 when the control device 104 is removed from the recessed cavity 105. In other embodiments, the control module 170 of control device 104 may be operative to establish the wireless communication connection. In either case, the established wireless communication connection may allow for the control device 104 and the computing device 100 to wireless exchange information. For example, a Bluetooth, Wifi or other wireless communication protocol may be used to establish the wireless communication connection.

The control module 108C may be operative on the one or more processors 108A to receive one or more control signals from the control device 104 via the wireless communication connection in some embodiments. For example, a control signal may be generated based on an input received at one or more of the input devices 110/112 of the control device 104, such as a button press by a user of the control device 104. Based on the one or more control signals, the control module 108C may be operative on the one or more processors 108A to change one or more graphical user interface (GUI) elements on the display 106. For example, the one or more GUI elements may comprise information displayed on display 106 such as a video game or other computer application and the control signals may function to signal desired changes to the video game or computing application.

In some embodiments, the control module 108C or 170 may be operative on the one or more processors 108A or 166 to deactivate the control device 104 when the control device 104 is arranged in the recessed cavity 105. For example, it may be desirable to conserve power and to avoid unintended inputs from the control device 104 to power it down or otherwise place it in a standby mode when nested or stowed in the recessed cavity 105. In these embodiments, one or more sensors in the control device 104 and/or the computing device 100 may be operative to deactivate the control device 104. Other embodiments are described and claimed.

Figure 9:
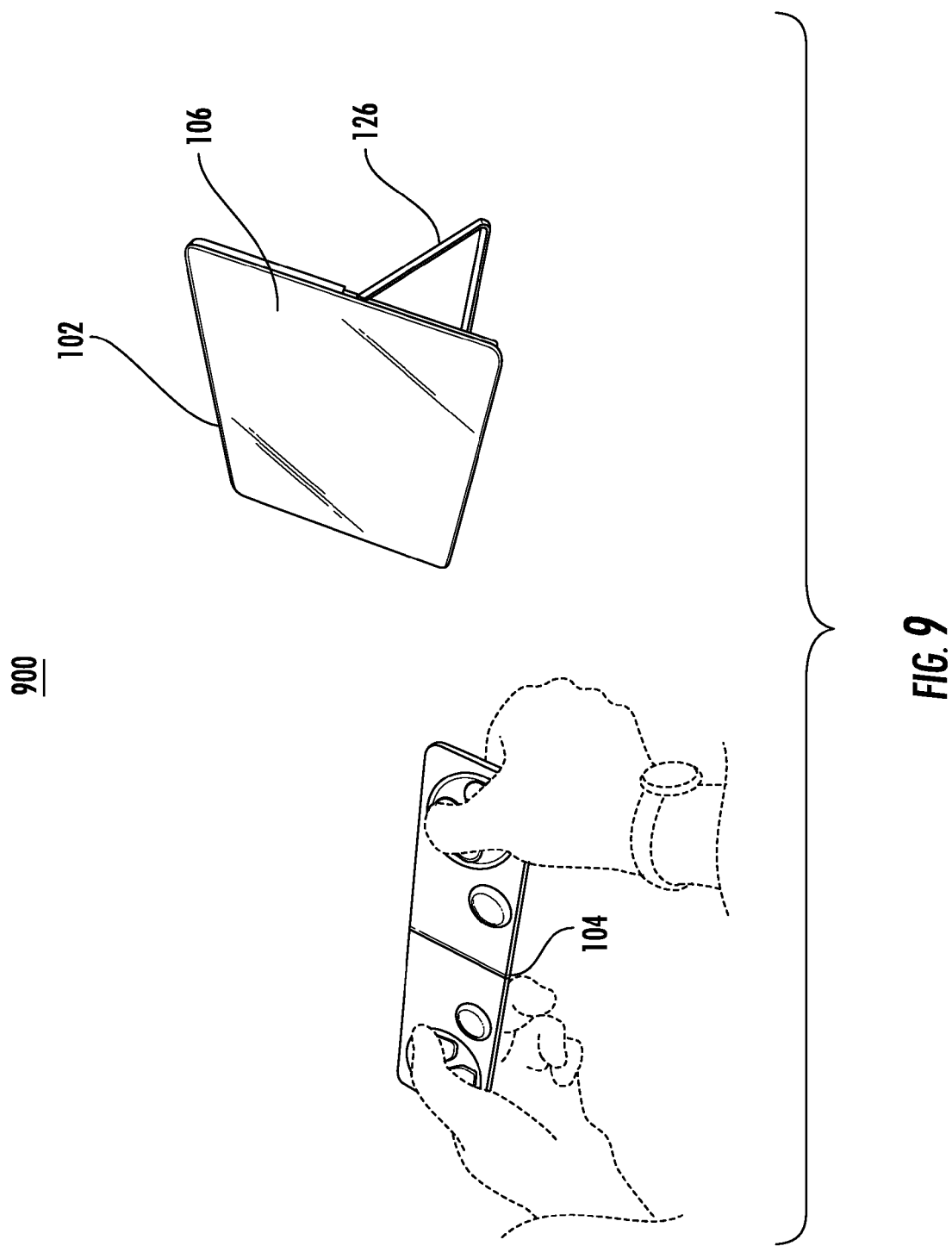
FIG. 9 illustrates one embodiment of a first example implementation.
Figure 10:
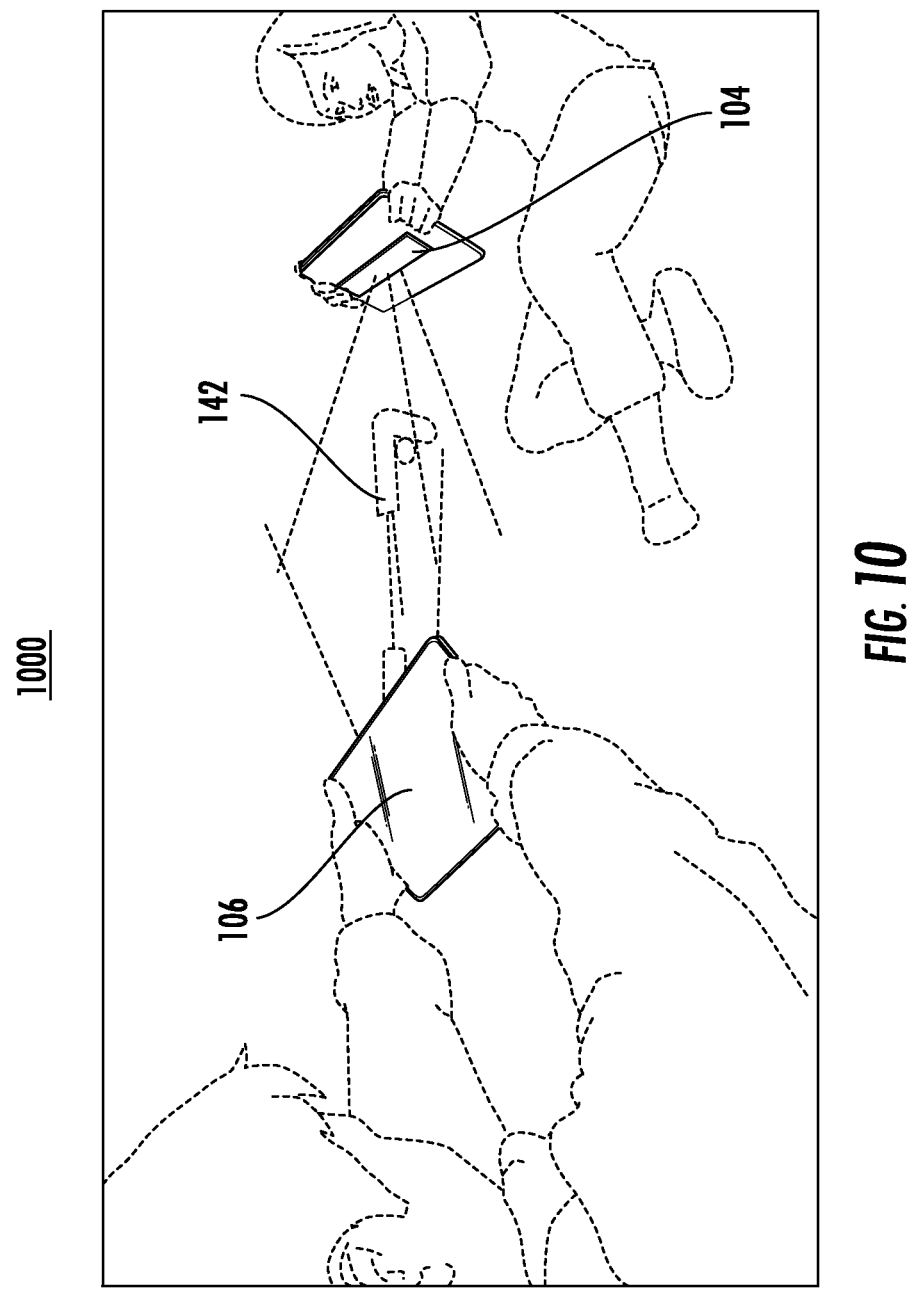
FIG. 10 illustrates one embodiment of a second example implementation.

The above-described embodiments may be better understood with reference to FIGS. 9-11 that include a plurality of usage scenarios or examples for one or more of the above-described embodiments. While a limited number and type of usage scenarios and examples are set forth, it should be understood that the embodiments are not limited in this respect.

FIG. 9 illustrates one embodiment of an example usage scenario that may include a mobile computing device and control device that may be the same or similar to mobile computing device 100 and control device 104 as described elsewhere herein where like elements are similarly numbered. As shown in FIG. 9, a user has removed the control device 104 from the recessed cavity 105 and has rotated the support member 126 to an angled position selected to support the enclosure 102. In this position, the user is able to sit back and view the information displayed on display 106 and interact with this information using control device 104 which is coupled to the computing device via a wireless communication connection.

FIG. 10 illustrates one embodiment of an example usage scenario that may include a mobile computing device and control device that may be the same or similar to mobile computing device 100 and control device 104 as described elsewhere herein where like elements are similarly numbered. As shown in FIG. 10, the control device 104 may be nested or stowed in the recessed cavity 105 on the back side 116 of each computing device which may allow for interactive gaming using the two computing devices shown. For example, the control devices 104 may be operative to generate laser beams, a laser matrix or light beams 142 using one or more integrated video or projection devices to enhance the gaming experience.

FIG. 11 illustrates one embodiment of an example usage scenario that may include a mobile computing device and control device that may be the same or similar to mobile computing device 100 and control device 104 as described elsewhere herein where like elements are similarly numbered. As shown in FIG. 11, the computing device and control device 104 may be operative to separately and/or collaboratively control or interact with a media entertainment or gaming system 150. In this regard, each device could be utilized by separate users to increase the enjoyment of gaming and other interactive activities. Other embodiments are described and claimed.

FIG. 12 is a diagram of an exemplary system embodiment. In particular, FIG. 12 is a diagram showing a system 1200, which may include various elements. For instance, FIG. 12 shows that system 1200 may include a processor 1202, a chipset 1204, an input/output (I/O) device 1206, a random access memory (RAM) (such as dynamic RAM (DRAM)) 1208, and a read only memory (ROM) 1210, and various platform components 1214 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 12, I/O device 1206, RAM 1208, and ROM 1210 are coupled to processor 1202 by way of chipset 1204. Chipset 1204 may be coupled to processor 1202 by a bus 1212. Accordingly, bus 1212 may include multiple lines.

Processor 1202 may be a central processing unit comprising one or more processor cores and may include any number of processors having any number of processor cores. The processor 1202 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 1200 may include various interface circuits, such as an Ethernet interface and/or a Universal Serial Bus (USB) interface, and/or the like. In some exemplary embodiments, the I/O device 1206 may comprise one or more input devices connected to interface circuits for entering data and commands into the system 1200. For example, the input devices may include a keyboard (physical or virtual/soft), mouse, touch screen, track pad, track ball, isopoint, a voice recognition system, and/or the like. Similarly, the I/O device 1206 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 1200 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments. Some embodiments may be better understood with reference to the following non-limiting examples.

In a first example, a computing device may comprise one or more processors and an enclosure arranged to support a display on a first side of the enclosure and a control device on a second side of the enclosure opposite the first side, the control device removeably arranged in a recessed cavity on the second side of the enclosure.

In a second example, a computing device may comprise a display comprising a touch-sensitive display communicatively coupled to one or more processors and a control device comprising a controller having one or more integrated input devices.

In a third example, a computing device may comprise a control module operative on one or more processors to establish a wireless communication connection with a control device when the control device is removed from a recessed cavity.

In a fourth example, the control module operative on the one or more processors to receive one or more control signals from the control device via the wireless communication connection.

In a fifth example, the control module operative on the one or more processors to change one or more graphical user interface (GUI) elements on the display based on the one or more control signals.

In a sixth example, a computing device may comprise one or more magnets arranged to secure the control device in the recessed cavity.

In a seventh example, a computing device may comprise a control module operative on the one or more processors to deactivate the control device when the control device is arranged in the recessed cavity.

In a eighth example, a computing device may comprise a moveable support member arranged as part of the enclosure, the support member operative to rotate to form a stand to support the computing device in a first position and to slide to support the control device is a second position.

In a ninth example, the support member arranged around a portion of a perimeter of the computing device.

In a tenth example, the display may be arranged to support one or more sets of removable input devices of the control device.

In a eleventh example, the control device may be arranged to protrude from the recessed cavity of the enclosure.

In a twelfth example, a system may comprise one or more processors coupled to a touch-sensitive display arranged on a first side of an enclosure, the enclosure having a recessed cavity arranged on a second side opposite the first side, and a control device removeably arranged in the recessed cavity on the second side of the enclosure.

In a thirteenth example, a control module may be operative on the one or more processors to establish a wireless communication connection with the control device when the control device is removed from the recessed cavity.

In a fourteenth example, the control module may be operative on the one or more processors to receive one or more control signals from the control device via the wireless communication connection.

In a fifteenth example, the control module may be operative on the one or more processors to change one or more graphical user interface (GUI) elements on the display based on the one or more control signals.

In a sixteenth example, the control module may be operative on the one or more processors to disable the control device responsive to an indication from one or more sensors arranged to detect the control device when arranged in the recessed cavity of the enclosure.

In seventeenth example, the system may comprise one or more magnets arranged to secure the control device in the recessed cavity.

In an eighteenth example, the system may comprise a moveable support member arranged around a portion of a perimeter of the computing device, the support member operative to rotate to form a stand to support the computing device in a first position and to slide to support the control device is a second position.

In an nineteenth example, the system may comprise one or more sets of removable input devices arranged as part of the control device, the computing device arranged to support the one or more sets of removable input devices.

In a twentieth example, the one or more sets of removable input devices operable when removed from the control device and coupled to the computing device.

In a twenty first example, the control device may be arranged to expand from a first size when arranged in the recessed cavity to a second size when removed from the recessed cavity.

In a twenty second example, the second size may be selected to be larger than the first size and the second size selected to be substantially the same as one side of the computing device.

In an twenty third example, the system may comprise a memory operative to store one or more applications operative on the one or more processors, the control device operative to control one or more functions associated with the one or more applications.

In an twenty fourth example, the system may comprise one or more input/output (I/O) devices arranged as part of the computing device.

In a twenty fifth example, the control device may be arranged to protrude from the recessed cavity of the enclosure and to have a tactile finish that is different than a finish of the computing device.

In a twenty sixth example, a control device may comprise one or more integrated input devices, a wireless transceiver operative to establish a wireless communication connection with a tablet computing device, and one or more magnets arranged to secure the control device in a recessed cavity of an enclosure of the tablet computing device.

In a twenty seventh example, the control device may comprise at least one removable input device operative when coupled to a display of the tablet computing device.

In a twenty eighth example, the control device may comprise a first portion arranged to support a first set of input devices, a second portion arranged to support a second set of input devices, and a third portion arranged to support the first and second portions and to allow the first or second portion to slide in a direction toward or away from the opposing portion to increase or decrease the size of the control device in at least one direction.

In a twenty ninth example, the control device may be operative to control one or more applications executed by one or more processors of the tablet computing device In a thirtieth example, the control device may comprise a power supply arranged to receive power from a power supply of the tablet computing device when the control device is arranged in the recessed cavity of the tablet computing device.

In a thirty first example, a method may comprise apply power to a device, detecting removal of a control device removeably integrated with the device, establishing a wireless connection between the device and the control device and receiving input signals from the control device, the input signals comprising control directives for an application executing on the device.

In a thirty second example, an article may comprise a computer-readable storage medium storing a plurality of instructions that when executed by a processor enable the processor to carry out the above-described method.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design, performance or cost constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may comprise a non-transitory medium in some embodiments and may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
   one or more processors; and
   an enclosure arranged to support a display on a first side of the enclosure and a control device on the first side of the enclosure and on a second side of the enclosure opposite the first side, the control device removeably arranged in at least a portion of a recessed cavity on the second side of the enclosure, the control device to slide open laterally to expand from a first size to a second size when removed from the recessed cavity, the enclosure comprising a moveable support member and a main body member, the moveable support to slide relative to the main body member to form an opening in the first side of the enclosure, the opening to be substantially sized to support the control device expanded to the second size on the first side of the enclosure.

2. The computing device of claim 1, the display comprising a touch-sensitive display communicatively coupled to the one or more processors and the control device comprising a controller having one or more integrated input devices.

3. The computing device of claim 1, comprising:
   control logic operative on the one or more processors to establish a wireless communication connection with the control device when the control device is removed from the recessed cavity.

4. The computing device of claim 3, the control logic operative on the one or more processors to receive one or more control signals from the control device via the wireless communication connection.

5. The computing device of claim 4, the control logic operative on the one or more processors to change one or more graphical user interface (GUI) elements on the display based at least in part on the one or more control signals.

6. The computing device of claim 1, comprising:
one or more magnets arranged to arrange the control device in at least a portion of the recessed cavity.

7. The computing device of claim 3, the control logic operative on the one or more processors to deactivate the control device when the control device is arranged in the recessed cavity.

8. The computing device of claim 1, the moveable support member arranged around at least a portion of a perimeter of the computing device.

9. The computing device of claim 1, the display arranged to support one or more removable sets of one or more input devices of the control device.

10. The computing device of claim 1, the control device arranged to protrude from the recessed cavity of the enclosure.

11. The computing device of claim 1, the moveable support member is a portion of a bezel of the enclosure.

12. The computing device of claim 11, the moveable support member comprising a track to laterally slide relative to the main body member.

13. A system, comprising:
a computing device comprising one or more processors coupled to a touch-sensitive display arranged on a first side of an enclosure, the enclosure having a recessed cavity arranged on a second side opposite the first side and a moveable support member, the moveable support member to slide relative to the enclosure to a first position; and
a control device removeably arranged in at least a portion of the recessed cavity on the second side of the enclosure, the control device to slide open laterally to expand from a first size to a second size when removed from the recessed cavity, the enclosure comprising a moveable support member and a main body member, the moveable support to slide relative to the main body member to form an opening in the first side of the enclosure, the opening to be substantially sized to support the control device expanded to the second size on the first side of the enclosure.

14. The system of claim 13, comprising:
control logic operative on the one or more processors to establish a wireless communication connection with the control device when the control device is removed from the recessed cavity.

15. The system of claim 14, the control logic operative on the one or more processors to receive one or more control signals from the control device via the wireless communication connection.

16. The system of claim 14, the control logic operative on the one or more processors to change one or more graphical user interface (GUI) elements on the display based on the one or more control signals.

17. The system of claim 14, the control logic operative on the one or more processors to disable the control device responsive to an indication from one or more sensors arranged to detect the control device when arranged in the recessed cavity of the enclosure.

18. The system of claim 13, comprising:
one or more magnets arranged to secure the control device in at least a portion of the recessed cavity.

19. The system of claim 13, comprising:
one or more removable sets of one or more input devices arranged as part of the control device, the computing device arranged to support the one or more removable sets of one or more input devices.

20. The system of claim 19, the one or more removable sets of one or more input devices operable when removed from the control device and coupled to the computing device.

21. The system of claim 13, the second size to be substantially the same as one side of the computing device.

22. The system of claim 13, the control device arranged to protrude from the recessed cavity of the enclosure.

23. The system of claim 13, the control device to have a tactile finish that is different than a finish of the computing device.

24. The system of claim 13, the moveable support member arranged around at least a portion of a perimeter of the computing device.

25. The system of claim 24, the moveable support member is a portion of a bezel of the enclosure.

26. The system of claim 24, the moveable support member comprising a track to laterally slide relative to the main body member.

27. A control device, comprising:
one or more integrated input devices; and
a wireless transceiver operative to establish a wireless communication connection with a tablet computing device;
the control device arranged to be removeably secured in at least a portion of a recessed cavity of an enclosure of the tablet computing device, the recessed cavity on a first side of the tablet computing device, the control device to slide open laterally to expand from a first size to a second size when removed from the recessed cavity, the control device to be removeably secured in an opening formed by sliding a moveable support member of the enclosure laterally to form the opening size to support the control device when the control device is in the second size.

28. The control device of claim 27, comprising:
at least one removable input device operative when coupled to a display of the tablet computing device.

29. The control device of claim 27, comprising:
a first portion arranged to support a first set of one or more input devices;
a second portion arranged to support a second set of one or more input devices; and
a third portion arranged to support the first and second portions and to allow the first or second portion to slide along one or more tracks in a direction toward or away from the opposing portion to increase or decrease the size of the control device in at least one direction.

30. The control device of claim 27, comprising:
a power supply arranged to receive power from a power supply of the tablet computing device when the control device is arranged in the recessed cavity of the tablet computing device.

31. The system of claim 14, comprising a network interface to interact with a media system, the media system causing one or more graphical user interface (GUI) elements to be represented on a secondary display, the control logic operative on the one or more processors to change the one or more GUI elements on the secondary display based on the one or more control signals.

* * * * *